United States Patent
Liu et al.

(10) Patent No.: US 12,242,964 B2
(45) Date of Patent: *Mar. 4, 2025

(54) METHOD AND APPARATUS FOR DATA EFFICIENT SEMANTIC SEGMENTATION

(71) Applicant: Samsung Electronics Co., Ltd., Gyeonggi-do (KR)

(72) Inventors: Qingfeng Liu, San Diego, CA (US); Mostafa El-Khamy, San Diego, CA (US); Jungwon Lee, San Diego, CA (US); Behnam Babagholami Mohamadabadi, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/341,050

(22) Filed: Jun. 26, 2023

(65) Prior Publication Data
US 2023/0334318 A1    Oct. 19, 2023

Related U.S. Application Data

(63) Continuation of application No. 17/241,848, filed on Apr. 27, 2021, now Pat. No. 11,687,780.

(Continued)

(51) Int. Cl.
*G06K 9/62* (2022.01)
*G06F 18/2321* (2023.01)
(Continued)

(52) U.S. Cl.
CPC ........... *G06N 3/08* (2013.01); *G06F 18/2321* (2023.01); *G06F 18/2323* (2023.01); *G06F 18/2415* (2023.01); *G06F 18/2431* (2023.01); *G06F 18/253* (2023.01); *G06F 18/254* (2023.01); *G06N 3/04* (2013.01); *G06N 3/045* (2023.01); *G06N 5/022* (2013.01); *G06N 5/025* (2013.01);
(Continued)

(58) Field of Classification Search
None
See application file for complete search history.

(56) References Cited

U.S. PATENT DOCUMENTS 9,858,525 B2   1/2018  Dai et al.
10,235,601 B1  3/2019  Wrenninge
(Continued)

FOREIGN PATENT DOCUMENTS

KR        102170620      10/2020

OTHER PUBLICATIONS

Calian et al., "Defending against image corruptions through adversarial augmentations." arXiv preprint arXiv:2104.01086 (2021). (Year: 2021).*

(Continued)

*Primary Examiner* — Feng Niu
(74) *Attorney, Agent, or Firm* — The Farrell Law Firm, P.C.

(57) ABSTRACT

A method and system for training a neural network are provided. The method includes receiving an input image, selecting at least one data augmentation method from a pool of data augmentation methods, generating an augmented image by applying the selected at least one data augmentation method to the input image, and generating a mixed image from the input image and the augmented image.

18 Claims, 7 Drawing Sheets

Related U.S. Application Data

(60) Provisional application No. 63/047,438, filed on Jul. 2, 2020.

(51) Int. Cl.

| | | |
|---|---|---|
| *G06F 18/2323* | (2023.01) | |
| *G06F 18/2415* | (2023.01) | |
| *G06F 18/2431* | (2023.01) | |
| *G06F 18/25* | (2023.01) | |
| *G06N 3/04* | (2023.01) | |
| *G06N 3/045* | (2023.01) | |
| *G06N 3/08* | (2023.01) | |
| *G06N 5/022* | (2023.01) | |
| *G06N 5/025* | (2023.01) | |
| *G06V 10/772* | (2022.01) | |
| *G06V 10/774* | (2022.01) | |
| *G06V 10/80* | (2022.01) | |
| *G06V 30/19* | (2022.01) | |

(52) U.S. Cl.
CPC .......... *G06V 10/772* (2022.01); *G06V 10/774* (2022.01); *G06V 10/806* (2022.01); *G06V 10/809* (2022.01); *G06V 30/19107* (2022.01); *G06V 30/1914* (2022.01); *G06V 30/19147* (2022.01); *G06V 30/1918* (2022.01)

(56) References Cited

U.S. PATENT DOCUMENTS

| | | | |
|---|---|---|---|
| 10,332,028 | B2 | 6/2019 | Talathi et al. |
| 10,664,722 | B1 | 5/2020 | Sharma |
| 10,949,649 | B2 | 3/2021 | Walker |
| 11,295,178 | B2 | 4/2022 | Peng |
| 11,361,192 | B2 | 6/2022 | Peng |
| 11,461,537 | B2 * | 10/2022 | Lundgaard ............. G06V 10/82 |
| 11,544,500 | B2 * | 1/2023 | Inoue ..................... G06N 3/08 |
| 2020/0151692 | A1 | 5/2020 | Gao |
| 2020/0210893 | A1 | 7/2020 | Harada |
| 2020/0250491 | A1 | 8/2020 | Pang |
| 2020/0250497 | A1 | 8/2020 | Peng |
| 2020/0257939 | A1 | 8/2020 | Inoue |
| 2020/0272806 | A1 | 8/2020 | Walker |
| 2020/0349711 | A1 | 11/2020 | Duke |
| 2021/0113078 | A1 | 4/2021 | Hamrah |
| 2021/0141995 | A1 * | 5/2021 | Lundgaard ............. G06V 10/40 |
| 2021/0158139 | A1 | 5/2021 | Mai |
| 2021/0383538 | A1 | 12/2021 | Deasy |
| 2022/0130136 | A1 | 4/2022 | Ando |
| 2022/0215209 | A1 | 7/2022 | Luong |
| 2023/0011053 | A1 | 1/2023 | Ando |
| 2024/0119714 | A1 * | 4/2024 | Wang ..................... G06V 10/80 |

OTHER PUBLICATIONS

Chen et al., "StackMix: A complementary Mix algorithm." arXiv preprint arXiv:2011.12618v2 (2021). (Year: 2021).*
Kim et al., "Puzzle mix: Exploiting saliency and local statistics for optimal mixup." In International Conference on Machine Learning, pp. 5275-5285. PMLR, 2020. (Year: 2020).*
Stickland et al., "Diverse ensembles improve calibration." arXiv preprint arXiv:2007.04206 (Jul. 8, 2020). (Year: 2020).*
Hoyle et al., "Improving neural topic models using knowledge distillation." arXiv preprint arXiv:2010.02377 (Oct. 5, 2020). (Year: 2020).*
Harchaoui, "Wasserstein Clustering." (Oct. 2020). (Year: 2020).*
Mikulik et al., "Meta-trained agents implement bayes-optimal agents." Advances in neural information processing systems 33 (Dec. 2020): 18691-18703. (Year: 2020).*
Wen et al., "Improving calibration of batchensemble with data augmentation." TWorkshop on Uncertainty and Ro-Bustness in Deep Learning (Jul. 17, 2020). (Year: 2020).*
Hendrycks, Dan et al., "AUGMIX: A Simple Data Processing Method to Improve Robustness and Uncertainty", arXiv:1912.02781v2 [stat.ML] Feb. 17, 2020, pp. 15.
Liu, Qiangfeng et al., "Diversification is All You Need: Towards Data Efficient Image Understanding", ECCV 2020 Workshop VIPriors Blind Submission, Jul. 20, 2020, pp. 14.
Chapelle, O. et al., "Vicinal risk minimization", In: Advances in Neural Information Processing Systems, pp. 416-422, 2001.
He, K. et al., "Deep residual learning for image recognition", arXiv:1512.03385v1 [cs.CV] Dec. 10, 2015, pp. 12.
Iandola, F. et al., "Densenet: Implementing Efficient ConvNet Descriptor Pyramids", arXiv:1404.1869v1 [cs.CV] Apr. 7, 2014, pp. 11.
Kayhan, O.S. et al., "On Translation Invariance in CNNs: Convolutional Layers can Exploit Absolute Spatial Location", arXiv:2003.07064v2 [cs.CV] May 30, 2020, pp. 12.
Shorten, C. et al. "A survey on image data augmentation for deep learning", Journal of Big Data 6(1), 60 (2019).
Shrivastava, A. et al., "Training Region-based Object Detectors with Online Hard Example Mining", arXiv:1604.03540v1 [cs.CV] Apr. 12, 2016, pp. 9.
Simonyan, K. et al., "Very Deep Convoluational Networks for Large-Scale Image Recognition", arXiv:1409.1556v6 [cs.CV] Apr. 10, 2015, pp. 14.
Wang, J. et al., "Deep High-Resolution Representation Learning for Visual Recognition", arXiv:1908.07919v2 [cs.CV] Mar. 13, 2020, pp. 23.
You, Y. et al., "ImageNet Training in Minutes", arXiv:1709.05011v10 [cs.CV] Jan. 31, 2018, pp. 11.
Yuan, Y. et al., "Object-Contextual Representations for Semantic Segmentation", arXiv:1909.11065v5 [cs.CV] Jul. 25, 2020, pp. 23.
Zhang, H. et al., "Mixup: Beyond Empirical Risk Minimization", arXiv:1710.09412v2 [cs.LG] Apr. 27, 2018, pp. 13.
Cubuk et al., "AutoAugment: Learning augmentation policies from data." arXiv:1805.09501v3, 2019. (Year: 2019).
Cubuk et al., "Randaugment: Practical automated data augmentation with a reduced search space." arXiv preprint arXiv:1909.13719, 2019. (Year: 2019).
Patel et al., "Multi-class uncertainty calibration via mutual information maximization-based binning." arXiv preprint arXiv:2006.13092 (Jun. 23, 2020). (Year: 2020).
Kaizuka, "Gradient-based Data Augmentation for Semi-Supervised Learning." arXiv preprint arXiv:2003.12824 (2020). (Year: 2020).
Almahairi, "Advances in deep learning with limited supervision and computational resources." PHD thesis, 2018. (Year: 2018).
Silveira et al., "Topic Modeling using Variational Auto-Encoders with Gumbel-Softmax and Logistic-Normal Mixture Distributions," 2018 International Joint Conference on Neural Networks (IJCN N), 2018, pp. 1-8, doi: 10.1109/IJCN N.2018.8489778. (Year: 2018).
Harris et al., "Fmix: Enhancing mixed sample data augmentation." arXiv preprint arXiv:2002.12047 (2020). (Year: 2020).
Sohn et al., "FixMatch: Simplifying Semi-Supervised Learning with Consistency and Confidence." arXiv preprint arXiv:2001.07685 (2020). (Year: 2020).
Leo et al., "SmoothMix: a Simple Yet Effective Data Augmentation to Train Robust Classifiers," 2020 IEEE/CVF Conference on Computer Vision and Pattern Recognition Workshops (CVPRW), Seattle, WA, USA, 2020, pp. 3264-3274, doi: 10.1109/CVPRW50498.2020.00386. (Date of Conference: Jun. 14-19, 2020). (Year: 2020).
Maronas et al., "Improving Calibration in Mixup-trained Deep Neural Networks through Confidence-Based Loss Functions." arXiv:2003.09946v2 (2020) (Year: 2020).
Raghu et al., "A survey of deep learning for scientific discovery." arXiv preprint arXiv:2003.11755 (2020). (Year: 2020).

* cited by examiner

METHOD AND APPARATUS FOR DATA EFFICIENT SEMANTIC SEGMENTATION

PRIORITY

This application is a Continuation Application of U.S. application Ser. No. 17/241,848, filed in the U.S. Patent and Trademark Office on Apr. 27, 2021, which is based on and claims priority under 35 U.S.C. § 119(e) to U.S. Provisional Patent Application Ser. No. 63/047,438, filed on Jul. 2, 2020, the entire contents of which are incorporated herein by reference.

FIELD

The present disclosure is generally related to a system and method for data efficient semantic segmentation.

BACKGROUND

There have been attempts to address the issue of lack of training data by data augmentation for image classification, such as Augmix, Mixup etc. However, it is not trivial to extend those works to the area of semantic segmentation since it is a position sensitive task that it needs careful consideration of changing the labels when image is augmented.

SUMMARY

According to one embodiment, a method for training a neural network includes receiving an input image, selecting at least one data augmentation method from a pool of data augmentation methods, generating an augmented image by applying the selected at least one data augmentation method to the input image, and generating a mixed image from the input image and the augmented image.

According to one embodiment, a system for training a neural network includes a memory and a processor configured to receive an input image, select at least one data augmentation method from a pool of data augmentation methods, generate an augmented image by applying the selected at least one data augmentation method to the input image, and generate a mixed image from the input image and the augmented image.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
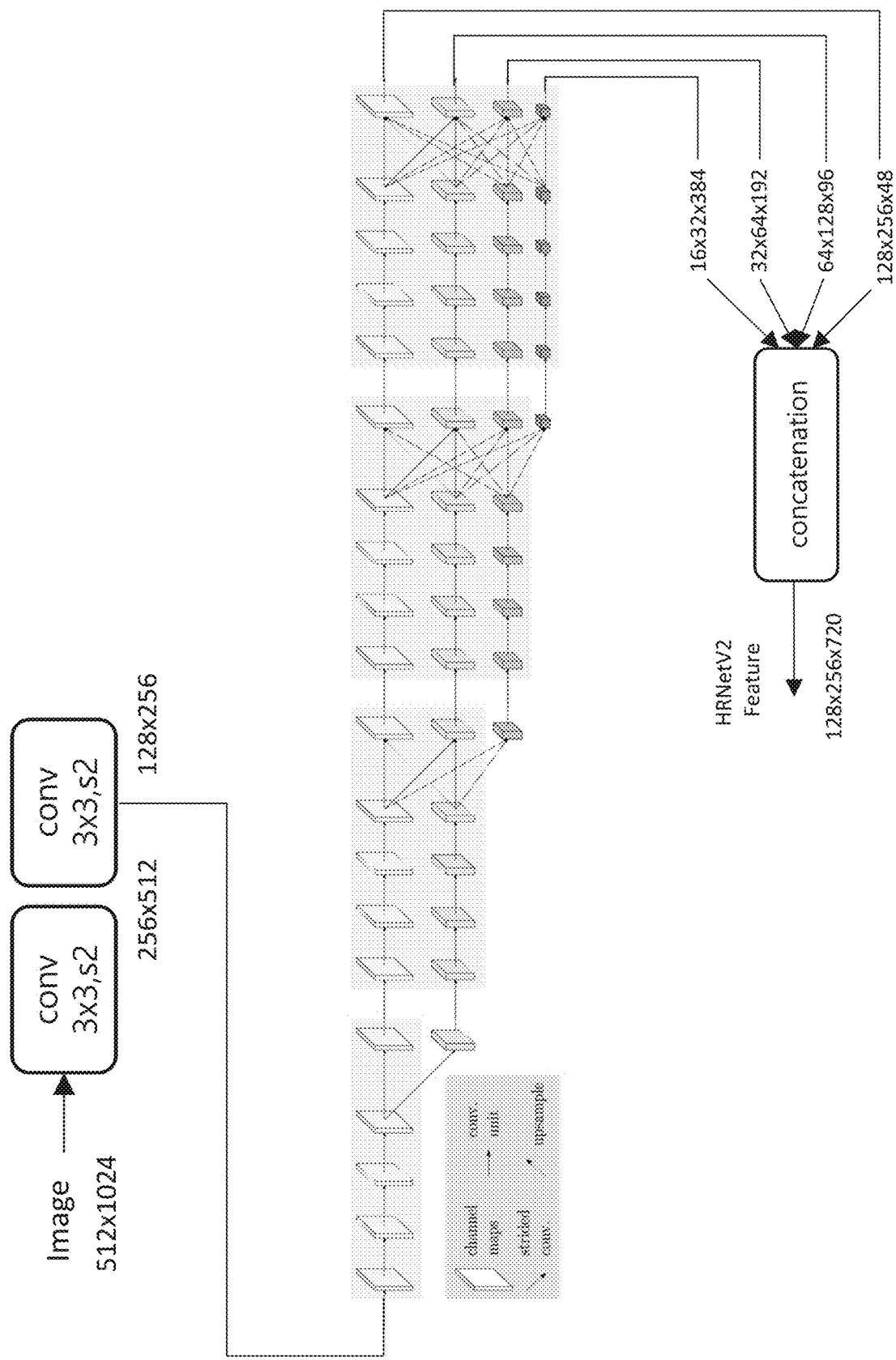
FIG. 1 illustrates a diagram of an architecture of high resolution network V2 (HRNet V2), according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

Semantic segmentation refers to the task of predicting the class of each pixel in the image. The present disclosure focuses on the scenarios where the labeled semantic segmentation training dataset is relatively small.

In some systems of semantic segmentation that mainly focus on better network architecture design, the data efficiency problem is ignored. But in practice, many areas have only limited amount of labeled training dataset. In particular, it requires a significant amount of human effort to label the semantic segmentation training dataset. The present system and method include a novel Augmix based data augmentation techniques by extending Augmix to the area of semantic segmentation, referred to as "seg-Augmix", to improve the performance of training under such scenarios when training dataset is small.

Some systems of semantic segmentation simply adopted an average ensemble method. The properties of the models to be put into an ensemble are not considered. The present system and method ensemble the models based on the per class performance. Specifically, the strength of each model is analyzed and more weights are assigned to classes that have better performance in the output logits of each model.

Disclosed herein is a semantic segmentation system that is able to achieve desired performance with a limited training dataset. First, the system applies seg-Augmix to preprocess the training dataset so that the semantic segmentation network has more available data to be trained. The seg-Augmix removed the data augmentation techniques used in Augmix that are position sensitive, such as shift, shear, etc., and maintains a pool of data augmentation methods. Then, the system applies a number of randomly chosen data augmentation methods from the pool to each batch during the training to generate the augmented images without changing the labels. Those augmented images may be mixed with the original image. The system then applies a Jensen-Shannon divergence consistency loss between the original image and the mixed image to prevent the instability of the training.

The present disclosure provides the techniques used based on the HRNet V2 and OCR.

First, a baseline HRNet V2-W48+OCR is learned using proper color jittering data augmentation, then it is fine-tuned with OHEM to address data imbalance using the training dataset and validation dataset. To evaluate the performance on test dataset, the system fine-tunes the learned baseline model using both training and validation dataset, and uses the ensemble model by the classwise Ensemble-Combining (EC) method to evaluate on the test dataset for submission to the official evaluation serve.

Second, several HRNet V2 variants, such as HRNet V2-W64 and HRNet V2-W32 with different complexities, are also used to learn a good model for ensemble prediction.

Third, advanced data augmentation techniques, such as seg-Augmix, are also applied to further improve performance. The system ports to the semantic segmentation by removing those position sensitive data augmentation techniques used in the original Augmix.

FIG. 1 illustrates a diagram of an architecture of HRNet V2, according to an embodiment. The key idea of HRNet V2 is to maintain the high resolution of the feature map since dense pixel prediction tasks such as semantic segmentation, depth estimation, may benefit from the higher resolution of feature map. Meanwhile, the multiple scale feature fusion is another important aspect for HRNet V2 to improve the performance of semantic segmentation. In addition to fusing the multiple scale features at the end of the backbone, HRNet V2 also fuses multiple scales in the middle of the backbone whenever down sampling happens.

Figure 2:
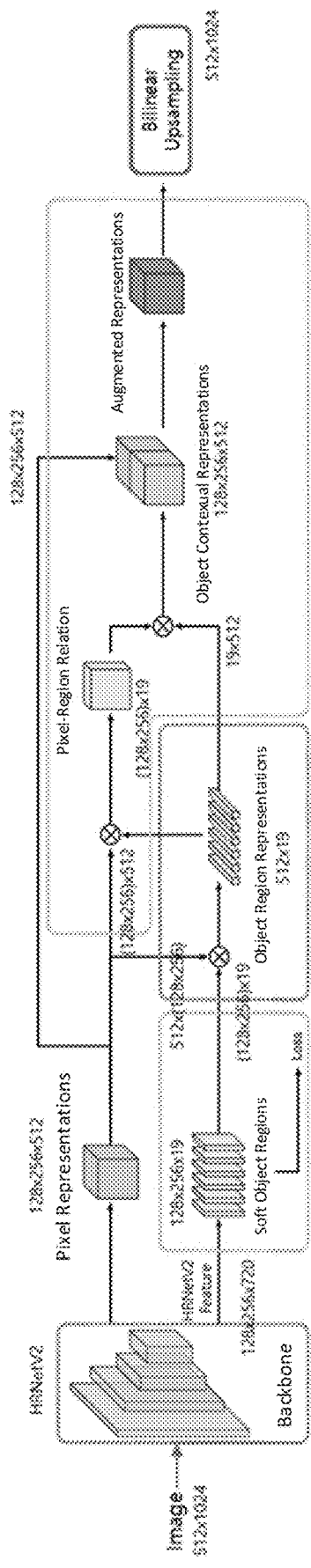
FIG. 2 illustrates a diagram of an architecture for object contextual representation (OCR), according to an embodiment.

FIG. 2 illustrates a diagram of an architecture for OCR, according to an embodiment. The key idea of OCR is to model the object level context information for each pixel. Specifically, the object level context of each pixel is defined as a weighted combination of object region feature, whose weights are determined by the similarities between the feature at the pixel and the feature of object region.

For data augmentation, deep convolutional neural networks benefit when labeled data are abundant, yet their performance degrades substantially when provided with limited supervision. Improving the generalization ability of these models in low data regimes is one of the most difficult challenges. Models with poor generalizability overfit the training data. Data augmentation is a very powerful method to address this challenge. The augmented data will represent a more comprehensive set of possible data points, thus minimizing the distance between the training and any future testing sets.

To achieve this goal, the system and method uses a combination of Augmix and Mixup for image classification. The goal of combining Augmix and Mixup for image classification is to combine the benefits of both approaches as Augmix focuses on within-class data diversification, while Mixup benefits from the between-class data diversification.

Without loss of generality, a multi-class (K class) classification problem is considered as the running task example. The joint space of inputs and classes labels are X x $\mathcal{Y}$, where X=$\mathbb{R}^d$ and $\mathcal{Y}$ ={1, . . . , K} for (K way) classification. $\mathcal{P}_{X \times \mathcal{Y}}$ is the probability distribution of the data points on the joint space. The system may learn a classifier $f_\theta$: $X \to Y$ with parameter $\theta$, using the optimization problem, as in Equation (1):

$$\theta^* = \operatorname*{argmin}_\theta \mathbb{E}_{(x,y) \sim \mathcal{P}_{X \times Y}} [\mathcal{L}_{cls}(f_\theta(x), y) + \gamma \mathcal{L}_{js}(f_\theta(x), f_\theta(x'), f_\theta(x''))] + \quad (1)$$

$$\beta \mathbb{E}_{(x_1,y_1) \sim \mathcal{P}_{X \times Y}} \mathbb{E}_{(x_2,y_2) \sim \mathcal{P}_{X \times Y}} \mathbb{E}_{\lambda \sim Beta(\alpha)} [\mathcal{L}_{cls} f_\theta(\lambda x_1 + (1-\lambda)x_2), (\lambda y_1 + (1-\lambda)y_2)]$$

where $\mathbb{E}$ denotes the expectation operator, $\mathcal{L}_{cls}$ denotes the standard cross entropy loss, x' and x" are two augmentations of x, $\alpha$, $\beta$, and $\gamma$ are the hyperparameters, and $\mathcal{L}_{js}$ is the Jensen-Shannon divergence between the classifier output of the original sample x and its augmentations x' and x".

Since the semantic content of an image is approximately preserved with Augmix augmentation, with $\mathcal{L}_{js}$, the classifier f is maps x, x' and x" close to each other in the output space. This is performed by first obtaining $\mathcal{M} = (f_\theta(x), f_\theta(x'), f_\theta(x''))/3$, and then determining the result of Equation (2):

$$\mathcal{L}_{js}(f_\theta(x), f_\theta(x'), f_\theta(x'')) = \quad (2)$$
$$\frac{1}{3}(KL[f_\theta(x); \mathcal{M}] + KL[f_\theta(x'); \mathcal{M}] + KL[f_\theta(x''); \mathcal{M}])$$

where KL[p;q] denotes the KL divergence between two probability vectors p and q (note that the output of the classifier f is a C dimensional probability vector). The optimization of Equations (1) and (2) may be solved with stochastic gradient descent (SDG) by approximating the expectation with sample averages.

Figure 3:
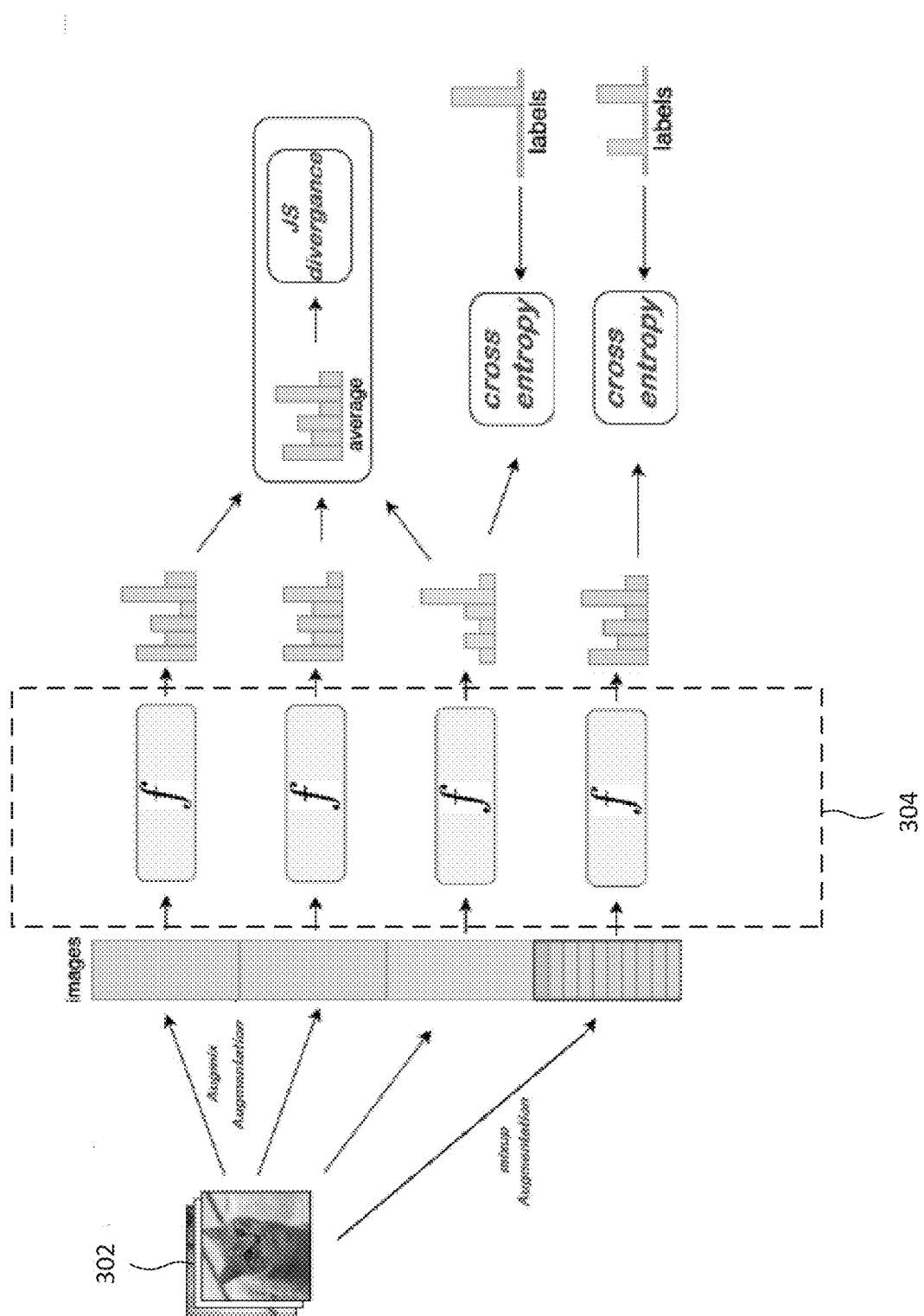
FIG. 3 illustrates a diagram of a scheme for image classification, according to an embodiment.

FIG. 3 illustrates a diagram of a scheme for image classification, according to an embodiment. In FIG. 3, each batch of images 302 goes through two types of augmentation pipelines. First, the images 302 are linearly combined to create mixup images. Augmix data augmentation is applied twice on each image to create augmix images. Then, all the augmented (mixup, augmix) images along with the original images are fed into the classification network 304 to produce class probability output. The cross entropy loss is applied on the original image network outputs and the mixup image network outputs. The Jensen-Shannon divergence loss is also applied on the original image network outputs and the augmix image network outputs.

Figure 4:
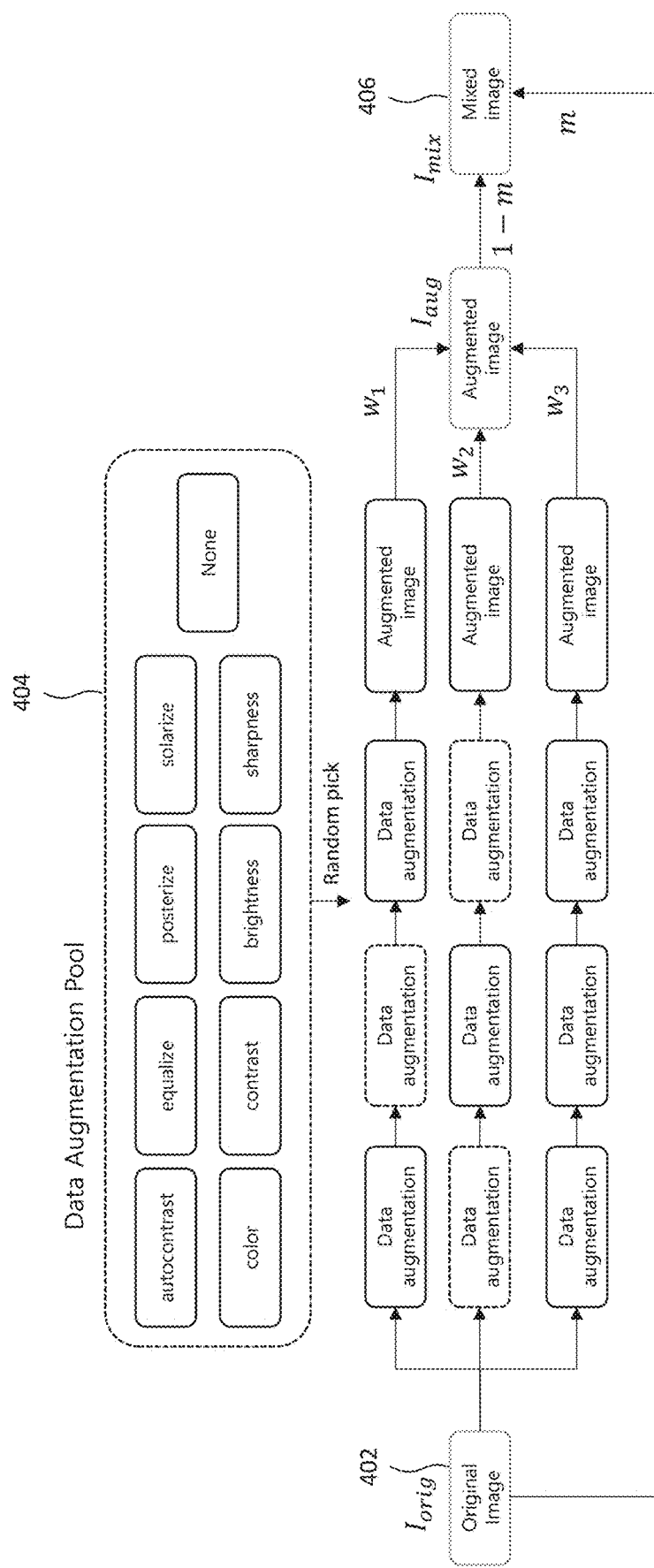
FIG. 4 illustrates a diagram of a seg-Augmix architecture, according to an embodiment.

FIG. 4 illustrates a diagram of a seg-Augmix architecture, according to an embodiment. The seg-Augmix architecture includes an original input image 402 and a data augmentation pool 404. The seg-Augmix architecture maintains a pool 404 of data augmentation methods, randomly selects a data augmentation method from the pool to be applied to each batch during training to generate augmented images without changing the labels, where the augmented images are mixed with the original image 402, and then applies the Jensen-Shannon divergence consistency between the original image 402 and the mixed image 406 to prevent instability of the training.

Specifically, the data augmentation method pool may include autocontrast, equalize, posterize, solarize, color, contrast, brightness and sharpness data augmentation techniques. Those methods only manipulate the pixel values rather than changing the position of the regions so that the ground truth segmentation map will not be changed. The "None" operation refers to no data augmentation method being applied.

When applying the selected data augmentation method, two hyperparameters, namely the mixture width $M_w$, and mixture depth $M_d$ will be defined first. Mixture width defines the number of branches for generating the augmented images, and mixture depth defines maximum number of consecutive data augmentations. As an example illustrated in FIG. 4, mixture width $M_w$=3 and mixture depth $M_d$=3. The mixture weights may be randomly generated from a Dirichlet distribution for each branch i. $f_i^{(M_d)}(x)$ is denoted as applying the data augmentation function $f$ for j times sequentially for branch i, where $j \in \{1, 2, \ldots, M_d\}$ is a randomly generated integer that is less than mixture depth $M_d$ for branch i. The final combination with the original image may use the weights generated from a Beta distribution. In the example shown in FIG. 4, the dashed data augmentation boxes indicate that the "None" augmentation method was selected (i.e., no data augmentation was applied).

The generated augmented image $I_{aug}$, and the generated mixed image $I_{mix}$ are defined as in Equations (3) and (4).

$$I_{aug} = \sum_{i=1}^{M_w} w_i f_i^{(j)}(I_{orig}), j \in \{1, 2, \ldots, M_d\} \quad (3)$$

$$I_{mix} = (1-m) * I_{aug} + m * I_{orig} \quad (4)$$

Then, the system generates two mixed images, and feeds the original image as well as the two mixed images to the network to generate three softmax logits, $p_{orig}$, $p_{mix1}$, and $p_{mix2}$. The additional Jensen-Shannon Divergence Consistency is defined in Equations (5) and (6):

$$JS(p_{orig}, p_{mix1}, p_{mix2}) = \quad (5)$$
$$\frac{1}{3}(KL[p_{orig} \parallel M] + KL[p_{mix1} \parallel M] + KL[p_{mix2} \parallel M])$$

$$M = \frac{1}{3}(p_{orig} + p_{mix1} + p_{mix2}) \quad (6)$$

where KL[x∥y] defines the KL divergence between x and y.

Test-time augmentation (TTA) is an application of data augmentation to the test dataset. It involves creating multiple augmented copies of each image in the test set, having the model make a prediction for each, then returning an ensemble of those predictions. A single simple TTA may be performed by randomly cropping the test image 10 times, making a prediction for each, and then returning an ensemble average of those predictions.

An FW model ensemble method (or classwise Ec method) may be applied instead of the average model ensemble method to improve the performance. First, the system may train an online hard example mining (OHEM) based version for each model based on an observation that the training dataset is imbalanced. The per-class performance indicates that the OHEM model performs better at low frequency classes, while the original model performs well at higher frequency models. The seg_Augmix based model can also improve the performance of low frequency classes due to the application of data augmentation. Higher weights may be applied to those classes. The system may assign more weights for low frequency classes for output logits for the OHEM model and the seg-Augmix model, when assembling them with the output logit of the original model.

For the OHEM and seg-Augmix models, the logits may be combined such that the low frequency classes will have higher weights. Assume the output softmax logits of the i-th model is $l_i \in R^{H \times W \times C}$, i=1, 2, . . . K, $w_i \in R^C$ is the per class weights for all the C classes, dup(x), $x \in R^C$ is the operation that duplicates of the value of each channel in x to H×W, this will return a size of $R^{H \times W \times C}$, then the predicted segmentation map of model ensemble will be as follows given than argmax(x, axis) will take the argmax of x along the axis, as in Equation (7)

$$seg = \mathrm{argmax}\left(\sum_i l_i dup(w_i), \mathrm{axis} = -1\right) \quad (7)$$

As a result, if $w_i=w_j$ for all the i≠j, then it is the equal weights ensemble for all the models. If model j performs better than model i, then we will have $w_i < w_j$ when it is using higher weights for better model. If model j performs better than model i in class c, $w_{ic} < w_{jc}$ when it is using higher per class-weights for models performing better on this class.

Figure 5:
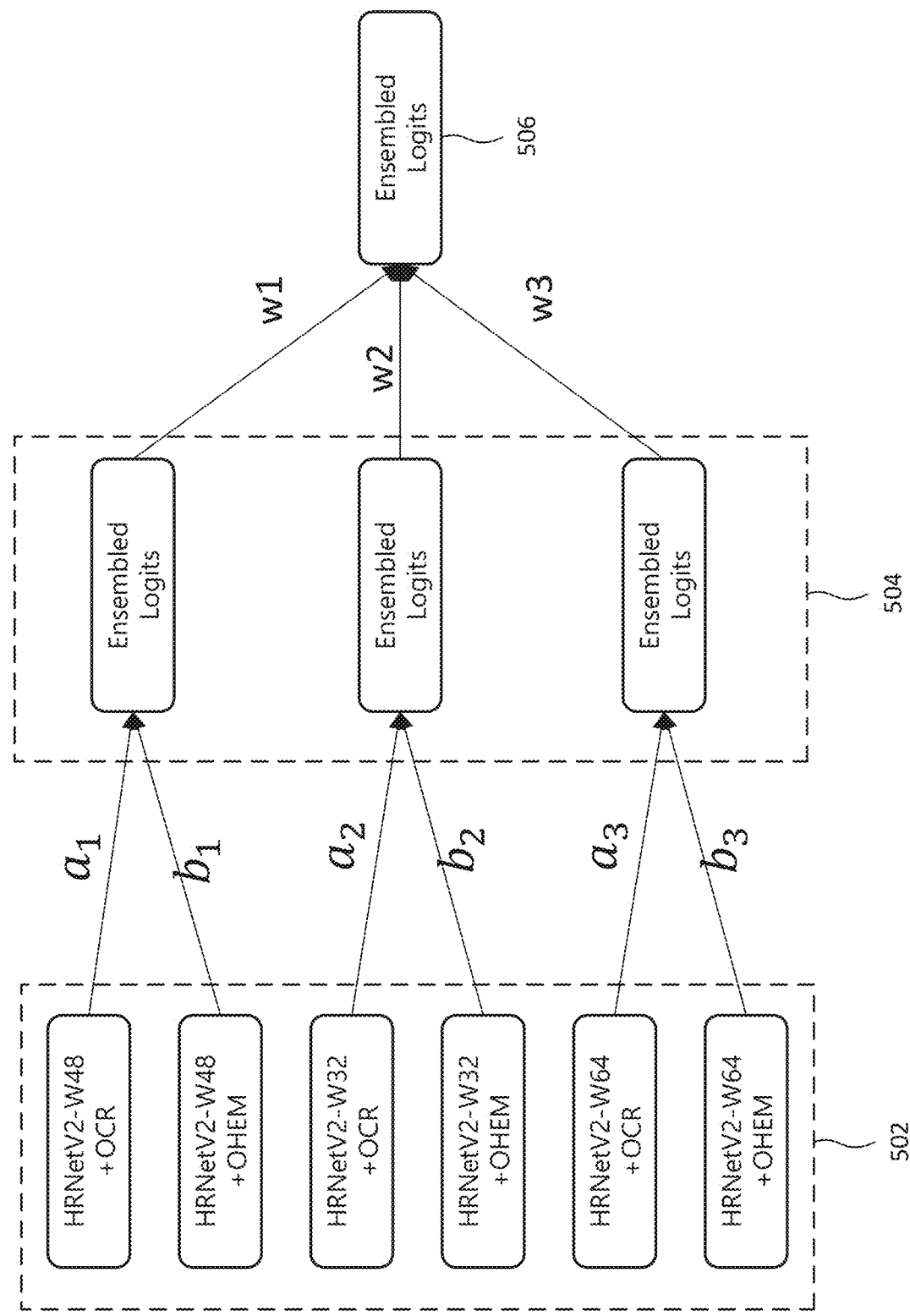
FIG. 5 illustrates a diagram of a frequency weighted (FW) model ensemble method, according to an embodiment.

FIG. 5 illustrates a diagram of an FW model ensemble method, according to an embodiment. For each model in the set of models 502, logit ensembles 504 are output based on the per-class performance where the better performance classes have higher weights. The output logit ensembles are further combined to produce logit ensemble 506.

Figure 6:
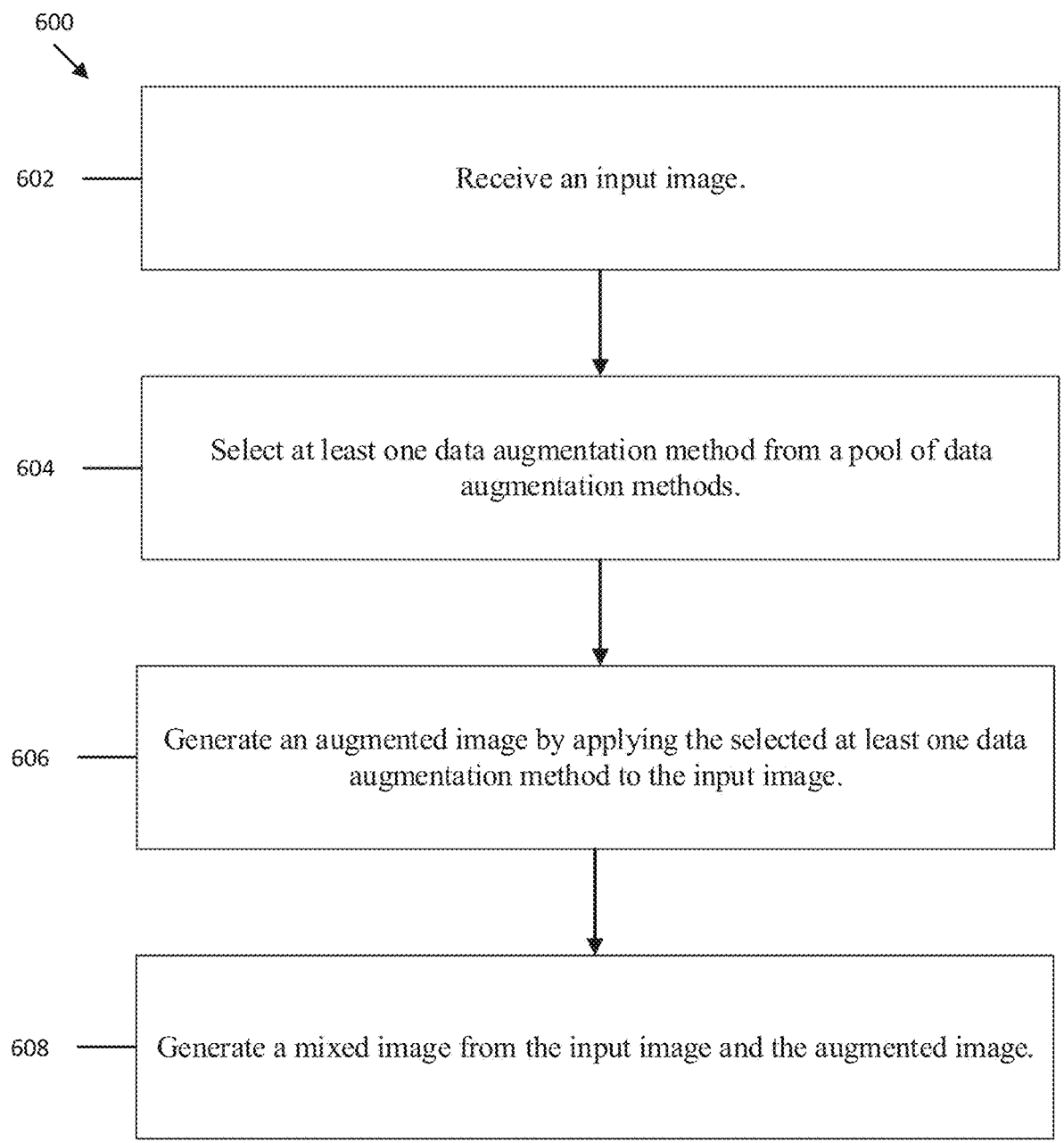
FIG. 6 illustrates a flowchart for a method of training a neural network, according to an embodiment.

FIG. 6 illustrates a flowchart 600 for a method of training a neural network, according to an embodiment. At 602, the system receives an input image. At 604, the system selects at least one data augmentation method from a pool of data augmentation methods. At 606, the system generates an augmented image by applying the selected at least one data augmentation method to the input image. At 608, the system generates a mixed image from the input image and the augmented image.

Figure 7:
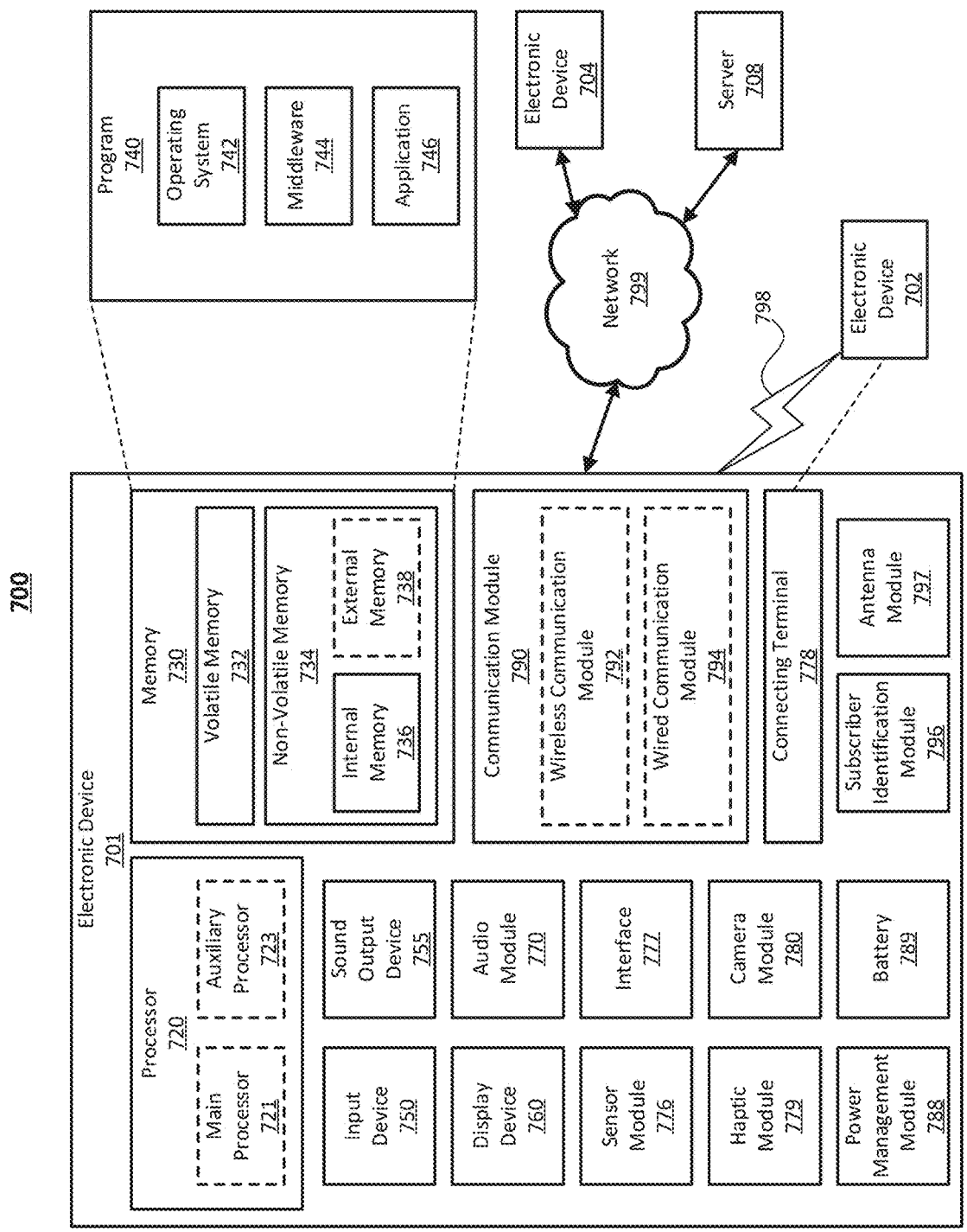
FIG. 7 illustrates a block diagram of an electronic device in a network environment, according to one embodiment.

FIG. 7 illustrates a block diagram of an electronic device 701 in a network environment 700, according to one embodiment. Referring to FIG. 7, the electronic device 701 in the network environment 700 may communicate with an electronic device 702 via a first network 798 (e.g., a short-range wireless communication network), or an electronic device 704 or a server 708 via a second network 799 (e.g., a long-range wireless communication network). The electronic device 701 may communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In one embodiment, at least one (e.g., the display device 760 or the camera module 780) of the components may be omitted from the electronic device 701, or one or more other components may be added to the electronic device 701. In one embodiment, some of the components may be implemented as a single integrated circuit (IC). For example, the sensor module 776 (e.g., a fingerprint sensor, an iris sensor, or an illuminance sensor) may be embedded in the display device 760 (e.g., a display).

The processor 720 may execute, for example, software (e.g., a program 740) to control at least one other component (e.g., a hardware or a software component) of the electronic device 701 coupled with the processor 720, and may perform various data processing or computations. As at least part of the data processing or computations, the processor 720 may load a command or data received from another component (e.g., the sensor module 776 or the communication module 790) in volatile memory 732, process the command or the data stored in the volatile memory 732, and store resulting data in non-volatile memory 734. The processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or execute a particular function. The auxiliary processor 723 may be implemented as being separate from, or a part of, the main processor 721.

The auxiliary processor 723 may control at least some of the functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to one embodiment, the auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by other component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. According to one embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to one embodiment, the audio module 770 may obtain the sound via the input device 750, or output the sound via the sound output device 755 or a headphone of an external electronic device 702 directly (e.g., wired) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device 702 directly (e.g., wired) or wirelessly. According to one embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device 702. According to one embodiment, the connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or an electrical stimulus which may be recognized by a user via tactile sensation or kinesthetic sensation. According to one embodiment, the haptic module 779 may include, for example, a motor, a piezoelectric element, or an electrical stimulator.

The camera module 780 may capture a still image or moving images. According to one embodiment, the camera module 780 may include one or more lenses, image sensors, image signal processors, or flashes.

The power management module 788 may manage power supplied to the electronic device 701. The power management module 788 may be implemented as at least part of, for example, a power management integrated circuit (PMIC).

The battery 789 may supply power to at least one component of the electronic device 701. According to one embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the AP) and supports a direct (e.g., wired) communication or a wireless communication. According to one embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or a standard of the Infrared Data Association (IrDA)) or the second network 799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. According to one embodiment, the antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 701 and the external electronic device 704 via the server 708 coupled with the second network 799. Each of the electronic devices 702 and 704 may be a device of a same type as, or a different type, from the electronic device 701. All or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

One embodiment may be implemented as software (e.g., the program 740) including one or more instructions that are stored in a storage medium (e.g., internal memory 736 or external memory 738) that is readable by a machine (e.g., the electronic device 701). For example, a processor of the electronic device 701 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for training a neural network, comprising receiving an input image;
generating an augmented image by applying at least one data augmentation method of a first data augmentation technique to the input image;
generating a mixed image from the input image and the augmented image; and
classifying the input image based on the mixed image and a resulting image from a second data augmentation technique,
wherein the first data augmentation technique and the second data augmentation technique are different data augmentation techniques, one being an Augmix data augmentation technique and another being a Mixup data augmentation technique.

2. The method of claim 1, further comprising performing Jensen-Shannon divergence consistency between the input image and the mixed image.

3. The method of claim 1, further comprising selecting the at least one data augmentation method from a pool of data augmentation methods, wherein the pool of augmentation methods includes at least one of an autocontrast data augmentation method, an equalize data augmentation method, a posterize data augmentation method, a solarize data augmentation method, a color data augmentation method, a contrast data augmentation method, a brightness data augmentation method, and a sharpness data augmentation method.

4. The method of claim 3, wherein the at least one data augmentation method is randomly selected.

5. The method of claim 1, further comprising generating softmax logits corresponding to the input image and the mixed image.

6. The method of claim 1, wherein applying the at least one data augmentation method includes defining a mixture width as a number of branches for generating the augmented image.

7. The method of claim 6, wherein applying the at least one data augmentation method includes defining a mixture depth as a maximum number of consecutive data augmentations for generating the augmented image.

8. The method of claim 7, wherein mixture weights are randomly generated from a Dirichlet distribution for each branch of the number of branches.

9. The method of claim 1, further comprising applying a cross entropy loss to the input image.

10. A system for training a neural network, comprising:
a memory; and
a processor configured to:
receive an input image;
generate an augmented image by applying at least one data augmentation method of a first data augmentation technique to the input image;
generate a mixed image from the input image and the augmented image; and
classify the input image based on the mixed image and a resulting image from a second data augmentation technique,
wherein the first data augmentation technique and the second data augmentation technique are different data augmentation techniques, one being an Augmix data augmentation technique and another being a Mixup data augmentation technique.

11. The system of claim 10, wherein the processor is further configured to perform Jensen-Shannon divergence consistency between the input image and the mixed image.

12. The system of claim 10, wherein the processor is further configured to select the at least one data augmentation method from a pool of data augmentation methods, and the pool of augmentation methods includes at least one of an autocontrast data augmentation method, an equalize data augmentation method, a posterize data augmentation method, a solarize data augmentation method, a color data augmentation method, a contrast data augmentation method, a brightness data augmentation method, and a sharpness data augmentation method.

13. The system of claim 12, wherein the at least one data augmentation method is randomly selected.

14. The system of claim 10, wherein the processor is further configured to generate softmax logits corresponding to the input image and the mixed image.

15. The system of claim 10, wherein applying the at least one data augmentation method includes defining a mixture width as a number of branches for generating the augmented image.

16. The system of claim 15, wherein applying the at least one data augmentation method includes defining a mixture depth as a maximum number of consecutive data augmentations for generating the augmented image.

17. The system of claim 16, wherein mixture weights are randomly generated from a Dirichlet distribution for each branch of the number of branches.

18. The system of claim 10, wherein the processor is further configured to apply a cross entropy loss to the input image.

* * * * *